United States Patent [19]

Bradley et al.

[11] Patent Number: 4,497,788

[45] Date of Patent: Feb. 5, 1985

[54] PROCESS FOR GROWING GRAPHITE FIBERS

[75] Inventors: John R. Bradley, Centerline, Mich.; James M. Burkstrand, Plymouth, Minn.; Gary G. Tibbetts, Birmingham, Mich.

[73] Assignee: General Motors Corporation, Detroit, Mich.

[21] Appl. No.: 434,734

[22] Filed: Oct. 18, 1982

[51] Int. Cl.$^3$ .................... D01F 9/12; C01B 31/04
[52] U.S. Cl. .................... 423/447.3; 423/448; 423/453; 423/458
[58] Field of Search .......... 423/447.3, 448, 453, 423/458; 156/613, DIG. 68, DIG. 112

[56] References Cited

U.S. PATENT DOCUMENTS

| | | | |
|---|---|---|---|
| 2,796,331 | 6/1957 | Kauffman et al. | 423/447.3 |
| 3,378,345 | 4/1968 | Bourdeau et al. | 423/447.3 |
| 3,664,813 | 5/1972 | Hollander, Jr. | 156/613 |
| 4,014,980 | 3/1977 | Fujimaki et al. | 423/448 |
| 4,391,787 | 7/1983 | Tibbetts | 423/447.3 |

FOREIGN PATENT DOCUMENTS 0056004 7/1982 European Pat. Off.
56118913 9/1981 Japan.

OTHER PUBLICATIONS

Baker, R. T. K. et al., "Chemistry & Physics of Carbon", vol. 14, pp. 83-165, (1978).
Endo et al., "Solid State Physics", vol. 12, No. 1, pp. 1-12, Jan. 1977.
Oberlin et al., "Journal of Crystal Growth", vol. 32, pp. 335-349, (1976).
Koyama et al., "Japanese Journal of Applied Physics", vol 11, No. 4, pp. 445-449, Apr. 1972.
Katsuki et al., "Carbon", vol. 19, pp. 148-150, (1981).

Primary Examiner—John Doll
Assistant Examiner—Steven Capella
Attorney, Agent, or Firm—Douglas D. Fekete

[57] ABSTRACT

In a preferred embodiment, graphite fibers are grown by natural gas pyrolysis on an iron-base metal surface initially bearing a relatively thick oxide.

6 Claims, 2 Drawing Figures

U.S. Patent  Feb. 5, 1985  4,497,788

PROCESS FOR GROWING GRAPHITE FIBERS

BACKGROUND OF THE INVENTION

This invention relates to manufacturing graphite fibers by thermally decomposing natural gas. More particularly, this invention relates to growing the graphite fibers on a heavily oxidized surface of an iron-base alloy to improve the yield of product fibers per unit area.

U.S. Pat. No. 4,391,787, filed July 9, 1981 and assigned to the present assignee, describes a process for manufacturing thin, straight graphite fibers that are suitable for filler in plastic or other composites. In a preferred embodiment, the process comprises flowing a natural gas stream through a thin-wall stainless steel tube surrounded by wet hydrogen gas and heating to pyrolyze methane in the natural gas. Initially, no fiber growth is observed. During this time, the natural gas carburizes the steel and produces a tube inner surface that is believed to affect subsequent methane pyrolysis in a manner that induces fiber growth. Hydrogen diffusion through the tube from the surrounding gas is believed to promote formation of this surface. In any event, after several hours, graphite fibers grow on the inner wall pointing downstream. The fibers grow quickly in length up to several centimeters and thereafter principally grow radially. Pyrolysis is continued until the fibers are about 5 to 15 microns in diameter. In this process, the natural gas, the stainless steel and the wet hydrogen cooperate in growing the fibers at the elevated temperature, and each is believed to play an important role.

It is an object of this invention to provide an improved process for manufacturing graphite fibers by pyrolysis of a hydrocarbon gas. More particularly, it is an object of this invention to provide improvements in the above-described process for growing graphite fibers by natural gas pyrolysis, which increase the number of product graphite fibers per area of growing surface, and thus potentially the total fiber yield and the process efficiency, to thereby ultimately reduce the cost of the fibers. It is an object of one aspect of this invention to provide a process for growing profuse graphite fibers by natural gas pyrolysis adjacent stainless steel that does not require remote contact by any special gas, such as the wet hydrogen gas in the above process.

It is also an object of this invention to provide an improved method for growing graphite fibers by methane pyrolysis, which method grows the fibers on a surface that is particularly conducive thereto to obtain a high yield of product fibers per unit area. In a preferred embodiment, fibers are grown on a heavily oxidized surface of an iron-base alloy.

It is an object of another aspect of this invention to provide a pretreatment for preparing a surface of an iron-base alloy for growing graphite fibers thereon, which pretreatment increases the yield of product fibers per unit area. The pretreatment is particularly well suited for preparing selected regions of the iron-base surface, for example, regions from which fibers may be readily harvested.

It is a more specific object of this invention to provide a two-part iron-chromium alloy pyrolysis surface, wherein graphite fibers are grown on one part from a precursor formed by natural gas pyrolysis at the other part. The fiber-growing part initially bears a relatively heavy, predominantly iron oxide and forms numerous sites for nucleating fiber growth so as to produce a high number of fibers per unit area. The two-part surface may be employed in a natural gas pyrolysis process such as the one described above that employs wet hydrogen gas; however, it is surprising that profuse fibers may be grown even without wet hydrogen or other special gas in contact with the alloy.

SUMMARY OF THE INVENTION

In a preferred embodiment, graphite fibers are grown by thermally decomposing a natural gas stream flowing through an elongated, thin-wall stainless steel tube. The natural gas flows sequentially over an upstream surface and a downstream surface of the inner wall. In accordance with this invention, profuse graphite fibers are grown on the downstream surface. The upstream surface initially bears only such oxide as is normally found on stainless steel that is exposed to air, which is a thin, protective film composed predominantly of chromium oxide. In contrast, the downstream, fiber-growing surface initially bears a relatively thick, predominantly iron oxide.

The tube is preferably surrounded by wet hydrogen gas. As the natural gas stream flows over the inner surfaces of the tube, it is heated to a temperature above 925° C. to decompose methane therein. At first, no fiber growth is observed. However, after several hours of continued flow and heating, numerous fibers grow out from the downstream surface. The fibers grow quickly in length and then principally grow radially. The flow of hot gas is continued for a time sufficient to thicken the fibers to a desired diameter. It is found that the surface initially having the heavy oxide produces as many as 20 times the fibers per unit area as similar surfaces without the heavy oxide.

While not wishing to be limited to any particular theory, it is believed that both the upstream, natural oxide surface and the downstream, heavy oxide surface have an important role in fiber growth. During the initial period before growth occurs, the upstream surface may be carburized and the resulting surface, which may include oxide-derived chromium carbide, may catalyze subsequent methane pyrolysis to form a carbonaceous precursor for growing fibers. At the same time, the downstream surface may be reduced and comprise numerous sites for nucleating fiber growth. After the surfaces are conditioned, the precursors, which are believed to form submicron globules, may be carried by the gas stream from the upstream surface and may deposit onto the downstream surface, where they interact with the nucleating sites and the fibers grow.

Contact of the tube outer surface with wet hydrogen gas is preferred to enhance fiber growth. Hydrogen diffuses through the wall and may aid to promote clean surfaces and reduce oxides. However, it is a surprising feature of this invention that profuse fibers grow on the heavily oxidized surface even in the absence of any special outer gas; for example, when the tube is surrounded by air.

The relatively thick oxide on the downstream surface is preferably formed by heating the surface while exposed to air to react the steel with oxygen. Prior to commencement of natural gas flow, while the tube is open to the air, a welding torch is applied to the outer wall opposite the surface. Torch heating is localized so that the downstream surface is oxidized, but upstream surfaces are not disturbed. Furthermore, localized heating may be limited to treating only a selected region of the overall downstream wall; for example, a surface wherefrom fibers may be readily collected. However formed, the heavy oxide is the site of profuse fiber growth.

DETAILED DESCRIPTION OF THE INVENTION

Figure 1:
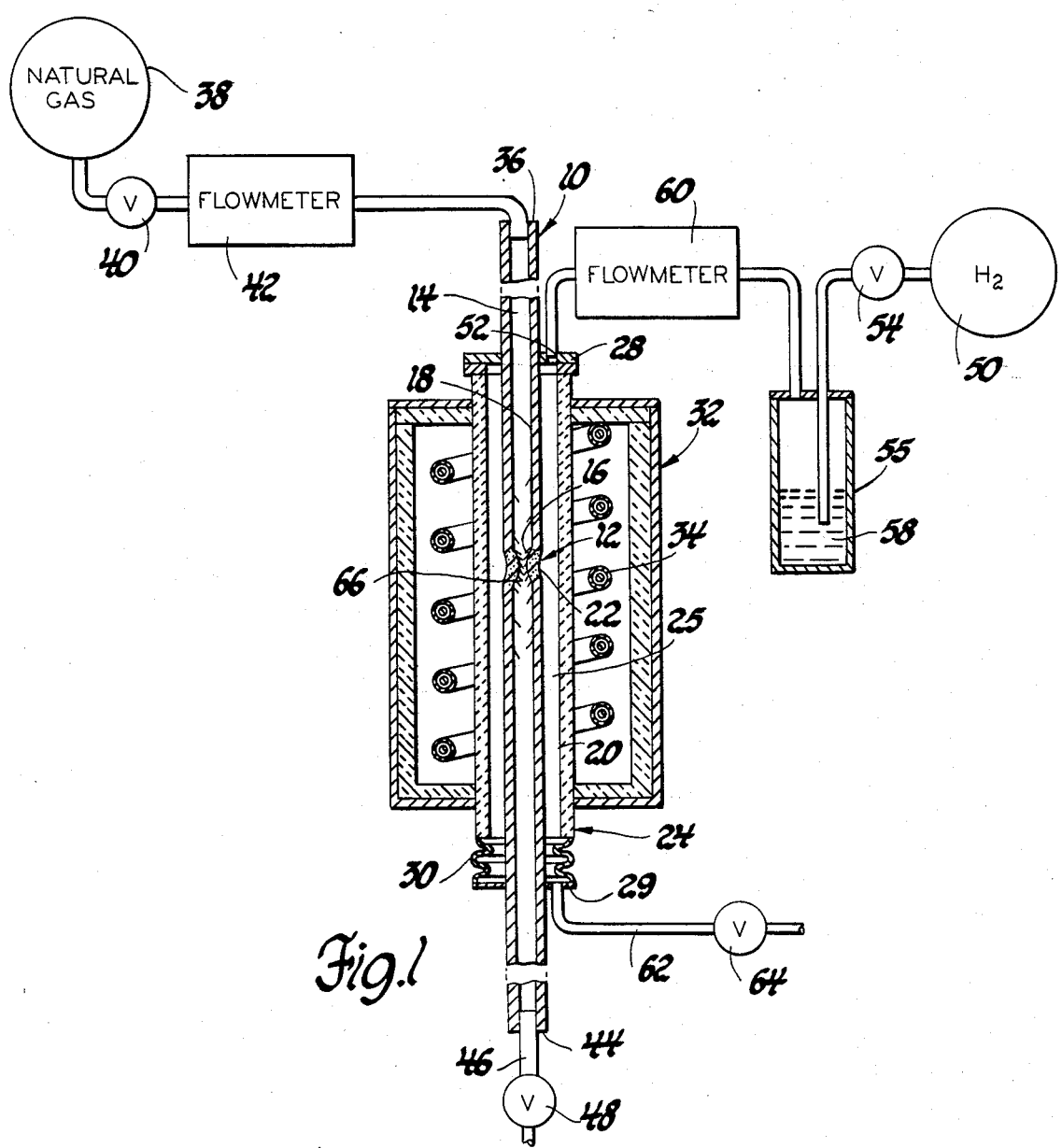
FIG. 1 is a cross-sectional schematic view of a graphite fiber growing apparatus having a region preoxidized in accordance with this invention for preferentially growing fibers thereon.
Figure 2:
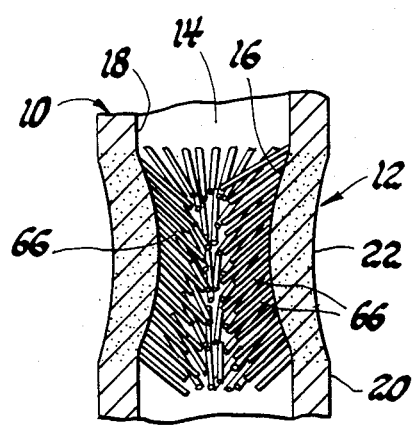
FIG. 2 is an enlarged view showing the fiber-growing region of the apparatus in FIG. 1.

Referring now to FIGS. 1 and 2, in a preferred embodiment, graphite fibers are grown within a cylindrical steel tube 10 having an annular zone 12, indicated by stippling, for growing a high density of fibers in accordance with this invention. Tube 10 has a central passage 14 for conveying natural gas and defined in part by a surface 16 of zone 12 and a surface 18 lying upstream from zone 12. The outer surface 20 of tube 10 includes a surface 22 of zone 12. Tube 10 is preferably composed of type 304 stainless steel consisting of about 18 to 20 weight percent chromium, 8 to 10 weight percent nickel, about 0.5 to 2.0 weight percent manganese, 0.08 maximum weight percent carbon, about 1.0 weight percent silicon, and the balance iron and impurities. The outer diameter is 1.25 cm and the wall thickness is about 0.8 mm. The overall length is about 75 cm; however, in this embodiment only a midsection about 20 cm long is heated to temperatures effective for growing fibers.

Prior to growing fibers, a band of metal in tube 10 is pretreated to form zone 12. Initially, the tube is substantially uniform in shape, composition and metallurgical properties, including surface appearance and properties, as is characteristic of commercially available tubing. The surface is protected by an oxide of the type that forms naturally when type 304 stainless steel is exposed to air. To form zone 12, outer surface 22 is locally heated using a tungsten inert gas welding torch while passage 14 is open to air. The welding torch comprises a protective argon gas shield about an inert electrode and heating is effectuated by an electric arc struck between the electrode and the tube. A single pass is made with the torch encircling the tube. The arc scans the circumference at a speed sufficient to initiate melting through the adjacent stainless steel wall in a manner similar to a full penetration weld. It is estimated that the steel is heated to 1500° C. for about 1 second. Heating softens the metal, whereupon the tube wall sags inwardly slightly, exaggerated in the figures for the purpose of illustration. After the torch passes, the steel cools and resolidifies. In comparison to untreated stainless steel, the metal in zone 12 is characterized by a presence of noticeable carbide precipitates and a finer grain structure. The average grain cross-sectional dimension is about 10 microns, compared to 50 microns in untreated metal. More significantly, heating the steel in contact with air oxidizes surface 16, forming an oxidized band about the tube inner wall. The resulting oxide is preferably about 5 microns thick, substantially thicker than sub-micron natural oxide. Because of the inert gas shield, relatively little additional oxidation occurs on outer surface 22. Neither is there significant additional oxidation of surfaces that are not immediately heated by the torch, particularly upstream inner surface 18.

After pretreatment, tube 10 is coaxially assembled within a cylindrical alumina jacket 24. The inner diameter of jacket 24 is about 3.1 cm, larger than tube 10 and creating a circumferential space 25 for conveying wet hydrogen gas about tube 10. End caps 28 and 29 hermetically seal tube 10 to cylinder 24 and include bellows 30 to compensate for differential thermal expansion. Jacket 24 is about 42.5 cm long and extends over a midsection of the tube that includes zone 12 and upstream surface 18. Tube 10 is hermetically attached to caps 28 with compression fittings (not shown) that allow the tube to be uncoupled and removed for conveniently collecting fibers.

Tube 10 and jacket 24 are assembled within an insulated furnace 32 having a coil resistance heating element 34. The furnace heats about 20 cm in length of tube 10 including zone 12 and upstream inner surface 18.

One end 36 of tube 10 adjacent upstream inner surface 18 is connected to a source of natural gas 38 through a valve 40 and a flowmeter 42. The opposite end 44 is connected to a gas exhaust tube 46 having a valve 48. The valves are opened and the flow of natural gas through tube 10 is adjusted to about 20 cc/min., corresponding to a residence time of about 60 seconds within the 20 cm length heated by furnace 32.

Jacket 24 is connected to a source of hydrogen 50 through an inlet 52 in end cap 28 nearest natural gas-admitting tube end 36. The connection to hydrogen source 50 is made through a valve 54, a bubbler 55 containing water 58 and a flowmeter 60. An outlet 62 having a valve 64 is provided through the opposite end cap 29. Thus, the flow of hydrogen through jacket 24 is generally in the same direction as the flow of natural gas through tube 10. The hydrogen flow through jacket 24 is adjusted to about 200 cc/min. Bubbler 56 is maintained at about room temperature and substantially saturates the hydrogen with water.

Before heating furnace 32, tube 10 and jacket 24 are thoroughly flushed with natural gas and wet hydrogen, respectively. Exhaust valves 48 and 64 are opened so that the gases are near atmospheric pressure. Furnace 32 is then activated to heat tube 10 and the gases to about 970° C. Under these conditions, fibers do not grow until after a few hours, then fibers 66 grow out from the inner surface of tube 10, particularly surface 16, at an acute angle to the surface pointing generally downstream. Very thin fibers rapidly grow to substantially full length and thereafter principally grow in diameter. After about 16 hours, tube 10 is uncoupled and cut longitudinally to observe the product fibers. Although some fibers grow on surfaces that were not initially oxidized, the density of product fibers per unit area is about 20 times greater on surface 16.

The fibers grown on surface 16 are substantially similar in appearance and properties to those grown on untreated surfaces. The fibers are generally straight and cylindrical and resemble very hard, very thin pencil leads. The fibers vary in length from less than a centimeter up to about 12 centimeters. However, the fibers are remarkably uniform in diameter, ranging, for example, between 10 and 15 microns. Electron microscopic examination reveals a fiber cross section that is characterized by rings or a spiral, that is, the graphite basal planes, are annular or helical. This is referred to as a scroll-like cross section and is in marked contrast to a radial basal plane orientation found in commercially available graphite fibers derived from pitch pyrolysis. Young's modulus for a representative batch of fibers was determined using an Instron tensile testing machine to range between 0.8 and $3.8 \times 10^{11}$ Pascals, thinner fibers having a generally higher modulus. The fibers are well suited for use as filler material.

Although the mechanism for fiber growth is not fully understood, it is believed that natural gas interaction with two types of stainless steel surfaces are involved in the described embodiment. The first type is not specially oxidized and thus bears only the oxide that forms normally on stainless steel exposed to air. This is referred to as a natural stainless steel surface and is provided by upstream surface 18 in FIG. 1. The second type is formed by pretreating the stainless steel to form a relatively heavy oxide thereon, as is the case for surface 16 in FIG. 1. Also, there are two stages of natural gas interaction with the surfaces; a first stage during which the surfaces are conditioned and a second stage during which fibers grow. The second stage involves two steps. The natural gas first pyrolyzes adjacent the conditioned natural stainless steel. The products of this reaction then flow downstream and grow fibers on the conditioned preoxidized surface. It is found that elimination of the step contacting the natural gas to the conditioned natural stainless steel, as by covering upstream surface 18, results in relatively few fibers grown on the heavily preoxidized surface.

More particularly, type 304 stainless steel normally bears a thin, protective oxide film. The oxide forms naturally upon exposure of bare stainless steel to air, for example, during tube manufacture, and is thus typically found on commercial stock in an as-received condition. The oxide is predominantly chromium oxide and is generally 100 to 1000 Angstroms thick. Once formed, the oxide normally inhibits further oxidation of the steel, giving the steel its stainless quality.

However, at elevated temperatures and in contact with natural gas, it is believed that the stainless steel and the thin oxide film carburize and produce, at the surface, a metal carbide characterized by an $M_7C_3$ formula. M may be a combination of chromium and iron, with sufficient chromium being present to form the $M_7C_3$ species despite the tendency of iron alone to form $Fe_3C$. It is believed that alloys containing at least 0.1 weight percent chromium, and preferably greater than 1 weight percent chromium, form the desired surface species.

This $M_7C_3$ species is believed to catalyze subsequent natural gas decomposition to produce carbonaceous globules. The globules are highly carbonized spheres on the order of 0.3 micron in diameter and are observed in the gas stream just prior to and during fiber growth. In experiments, the equipment in FIG. 1 was modified to include a quartz window that provided visual access into tube 10 during fiber growth. At elevated temperatures, the tube glowed red to light the interior. Initially, the natural gas stream appeared clear. However, after a few hours, the gas became cloudy, indicating the presence of globules. Shortly thereafter, fibers were observed growing. No fibers are found in experiments that fail to form globules. It is believed that the globules may supply carbon in a precursor form suitable for growing fibers.

The improved fiber growing surface initially bears an oxide layer that is substantially thicker than the natural oxide. During the conditioning stage, a carbonaceous layer forms that contains numerous submicron metallic particles. The minute particles are believed to nucleate fiber growth. The particles may be produced by fragmentation of the steel during the oxidation process. Another possibility is that the particles form upon reduction or carburization of the thick oxide by the natural gas. Hydrogen diffusing through the steel wall from the jacket gas may aid in reducing the oxide. However the particles are formed, it is believed they act as nuclei and interact with globules from the gas stream in a manner not fully understood to grow fibers. The profuse fibers produced on the preoxidized surface are attributed to the high number of metallic nuclei formed there, substantially more than found on similar natural oxide-derived surfaces.

For whatever reason, it has been found that oxidation of the stainless steel surface prior to the commencement of natural gas pyrolysis substantially increases the number of product fibers per unit area. In other experiments, tube 10 in FIG. 1 is replaced by a stainless steel tube similarly heated with a welding torch, but while the passage through the tube contains inert argon gas so that no oxidation of the inner surface occurred. No improvement in the number of fibers grown per unit area is observed for the unoxidized, heat treated surface. In general, it is believed that fiber growth is enhanced where the surface oxide is about 1 micron thick. The preferred oxide is about 5 microns thick. The oxide is preferably not so heavy that spalling results.

At normal temperatures, the natural oxide protects the underlying stainless steel from further oxidation. However, at elevated temperatures such as produced by a welding torch, the natural oxide loses its protective quality and the underlying alloy is oxidized. Electron probe analysis of the oxide formed on type 304 stainless steel heated in air indicates that its metal content comprises about 55 weight percent iron, about 7 weight percent chromium, about 2 weight percent silicon, about 36 weight percent magnanese, and only trace amounts of nickel. Thus, in comparison to a natural chromium oxide film, the heavier oxide contains substantially more iron oxide.

The improvement in fiber production found by oxidizing the surface prior to fiber growth is not limited to stainless steel surfaces. In another embodiment, an AISI-SAE type 1010 mild steel tube is heavily oxidized by heating in contact with air to form a relatively thick, predominantly iron oxide layer thereon. The mild steel tube is welded end-to-end to a type 304 stainless steel tube such that the welded tube has a continuous bore. The welded tube is substituted for tube 10 in FIG. 1 such that weld-adjacent portions of both the mild steel and stainless steel are within the furnace hot zone and natural gas flows first through the stainless steel section. The tube is surrounded by wet hydrogen gas and heated to about 970° C. After about 11 hours, fibers grow on the preoxidized mild steel surface. In contrast, few fibers grow on similar mild steel surfaces that are not initially heavily oxidized. If, as theorized, minute particles are responsible for nucleating fibers, then the particles derived from mild steel may be expected to be principally iron, which may also be true of particles derived from stainless steel.

In the detailed embodiment, tube 10 is surrounded by flowing wet hydrogen gas. Some hydrogen dissolves into the steel and diffuses through the wall. Hydrogen reaching the tube inner surfaces in contact with the natural gas stream may aid in conditioning the surfaces, for example, by reducing or fragmenting oxides there.

Also, some carbon derived from natural gas pyrolysis diffuses through the steel and is extracted into the jacket gas, probably by an oxidation reaction involving the water. This carbon removal may aid in maintaining clean reaction surfaces. Thus, it is believed that the fiber growing process is enhanced by the wet hydrogen gas in the jacket. However, profuse fibers are grown on preoxidized surfaces even in the absence of wet hydrogen gas. In another embodiment, equipment in FIG. 1 is modified to eliminate jacket 24 and the wet hydrogen gas so that the tube is surrounded by air. The tube is first treated as described with a welding torch to heavily oxidize an inner surface, i.e., surface 16. Natural gas is flowed through the tube, and the tube and gas are heated to about 970° C. Profuse fibers grow on the treated surface, even though few, if any, fibers grow on untreated surfaces. Thus, a heavily preoxidized surface is so conducive to fiber growth that opposite contact with wet hydrogen is not required, although it is preferred.

In the detailed embodiment, oxidation of the inner surface of the tube is accomplished by a welding torch applied to outer surface. Although the outer surface is preferably protected by an argon gas shield, oxidation of the outer surface does not significantly affect fiber growth. Other techniques are also suitable for oxidizing the surface. For example, applying a welding torch directly to the fiber-growing surface while exposed to air improves the yield of fibers there. Improvement is found even though the heat-affected zone does not penetrate the wall to produce incipient melting therethrough. Although torch heating is convenient for treating localized surfaces, suitable oxides may be formed by other heating means, such as a furnace.

Profuse fibers also grow on surface of a type 304 stainless steel fillet utilized for welding tube segments while exposed to air. In another example, a tube is prepared by welding a chromium-free iron tube segment between two stainless steel tube segments using type 304 stainless steel fillets. Welding is carried out in air, but the tube surfaces are not otherwise pretreated to form heavy oxides. The welded tube is substituted for tube 10 in FIG. 1, with both welds lying within the furnace hot zone. The natural gas stream through the tube flows through a stainless steel segment before reaching the intermediate iron tube. Upon heating for several hours with continual natural gas flow, profuse fibers grow on the fillets, in contrast to the sparse fibers, if any, that grow on the iron or remaining stainless steel surfaces. The fibers found on the fillet located on the opposite end of the iron segment from the upstream stainless steel segment indicates that fiber growth may be carried out with the precursor-forming surface spaced apart from the growing surface.

Although in the described embodiments fibers are grown on an inner surface of a tube, the method of this invention is suitable for improving fiber growth on nontubular surfaces. For example, profuse fibers may be grown on an oxidized iron strip suspended in a natural gas stream within a stainless steel tube. Also, while this invention has been demonstrated to increase the yield of fibers on a surface of a relatively small area, such as the single band encircling tube 10 in FIG. 1, oxides covering a greater surface area may be employed to provide a larger harvest of fibers. Larger growing surfaces may improve efficiency of the process as measured by the fiber yield per natural gas volume. A principal advantage of this method is that selected surfaces may be oxidized to improve fiber growth. For example, instead of a single band about the tube, a helical or longitudinal strip may be readily formed by torch heating. It is particularly useful to oxidize surfaces from which fibers may be readily harvested. Thus, a fiber-growing substrate may be heavily oxided and placed in a natural gas stream downstream from a precursor-forming surface. After the fibers are grown, the substrate may be removed from the stream for harvest, without interfering with the precursor surface.

In the described embodiments, fibers are preferably grown from natural gas. Natural gas is preferred because it is relatively plentiful and inexpensive and produces a high yield of fibers. A preferred natural gas contains, by volume, 0.5 maximum percent nitrogen, 0.6 maximum percent carbon oxides, 4.0 maximum percent ethane, 1.1 maximum percent higher hydrocarbons, and the balance methane. The gas is commercially obtained, in bottle form, from Airco, Inc. and designated methane grade 1.3. City natural gas containing 1.2 percent nitrogen, 0.7 percent total oxide, 1.9 percent ethane, 0.6 percent hydrogen, 0.5 percent heavy hydrocarbons, and the balance methane also produces good fibers. Natural gas produces substantially more fibers than methane alone, perhaps because growth is promoted by the presence of carbon oxides, ethane or other hydrocarbons, generally considered impurities in natural gas. Also, although natural gas pyrolysis is preferably carried out between 925° C. and 1075° C., and more preferably between 970° C. and 1000° C., fibers may be suitably grown at temperatures up to 1150° C. or higher.

Although this invention has been described in terms of certain embodiments thereof, it is not intended that it be limited to the above description but rather only to the extent set forth in the claims that follow.

The embodiments of the invention in which an exclusive property or privilege is claimed are defined as follows:

1. A process for manufacturing graphite fibers of a type suitable for use as filler in plastic composites, said process comprising
    flowing a predominantly methane gas over a first surface of a suitable chromium-containing iron-base alloy initially bearing a thin oxide of a type that naturally forms when exposed to air at ambient temperatures and thereafter over a second surface formed of an iron-base metal and initially bearing a predominantly iron oxide formed by heating the iron-base metal while exposed to air, and
    heating said gas stream and said surfaces, while continuing said gas flow, at an elevated temperature and for a time sufficient to grow said graphite fibers on the second surface.

2. A process for manufacturing graphite fibers of a type suitable for use as filler in plastic composite, said fibers having a scroll-like cross-section and being 5 to 100 microns in diameter and up to several centimeters long, said process comprising
    flowing a stream of a predominantly methane gas over a flow path comprising an upstream surface formed of a suitable chromium-containing iron base alloy and initially bearing a thin oxide of the type that naturally forms upon ambient air exposure, and a downstream surface formed of an iron-base metal and initially bearing a predominantly iron oxide greater than 1 micron thick,
    heating the gas stream in contact with the surfaces to carburize the upstream surface to produce thereon a chromium-containing $M_7C_3$ carbide suitable for catalyzing methane pyrolysis to form carbonaceous globules and to produce on the downstream surface metallic particles suitable for nucleating fiber growth from said globules, and continuing said gas stream flow and heating for a time sufficient to form carbonaceous globules at the upstream surface that enter the stream and are carried to the downstream surface and to cause said globules to interact with the nuclei on the downstream surface to grow the graphite fibers.

3. A process for manufacturing graphite fibers of a type suitable for use as filler in plastic composites, said process comprising flowing a natural gas stream over a stainless steel wall containing at least 1 weight percent chromium such that the stream flows sequentially over an upstream surface and a downstream surface, said upstream surface initially bearing a thin oxide of a type that naturally forms on stainless steel exposed to air at about room temperature, said downstream surface initially bearing a thick oxide on the order of 5 microns thick and of a type formed by heating in air to oxidize stainless steel, heating said wall and gas stream at a temperature sufficient to pyrolyze methane in said natural gas, and continuing said heating and gas flow for a time sufficient to grow the graphite fibers on the downstream surface that are 5 to 100 microns in diameter and up to several centimeters long.

4. A process for manufacturing graphite fibers of a type suitable for use as filler in plastic composites, said fibers having a scroll-like cross section and being 5 to 100 microns in diameter and up to several centimeters long, said process comprising flowing a natural gas stream over one side of a thin stainless steel wall formed of an iron-base alloy containing at least 1 weight percent chromium such that the gas stream flows sequentially over an upstream surface and a downstream surface, said upstream surface initially bearing a naturally formed chromium oxide film, said downstream region initially bearing a predominantly iron oxide on the order of 5 microns thick and formed by heating said wall while exposed to air, contacting a predominantly hydrogen gas containing water to a second side of the stainless steel wall opposite the upstream and downstream surfaces of the first side, heating the wall and gases to a temperature between 970° C. and 1000° C., and continuing for a time sufficient to grow graphite fibers on the downstream surface.

5. A process for manufacturing graphite fibers comprising heating an iron-base metal surface while exposed to air to oxidize said surface to form thereon a predominantly iron oxide layer at least 1 micron thick, exposing the oxidized surface to a gas stream formed by methane pyrolysis in the presence of a chromium-base $M_7C_3$ carbide, and growing graphite fibers upon the initially oxidized surface from carbonaceous precursors formed by said methane pyrolysis.

6. A process for manufacturing graphite fibers comprising heating a stainless steel surface while exposed to air at a temperature sufficient to oxidize said surface to form thereon a predominantly iron oxide layer on the order of 5 microns thick, contacting said oxidizing surface with a gas stream formed by natural gas pyrolysis adjacent a stainless steel surface that initially bears only such oxide as naturally forms upon exposure to air at ambient temperatures, and growing graphite fibers upon said previously oxidized surface from carbonaceous precursors formed by said natural gas pyrolysis.

* * * * *

UNITED STATES PATENT AND TRADEMARK OFFICE
CERTIFICATE OF CORRECTION

PATENT NO. : 4,497,788
DATED : February 5, 1985
INVENTOR(S) : John R. Bradley et al It is certified that error appears in the above-identified patent and that said Letters Patent is hereby corrected as shown below:

Column 10, line 32, "oxidizing" should read
    -- oxidized --.

Signed and Sealed this

Sixteenth Day of July 1985

[SEAL]

Attest:

DONALD J. QUIGG

Attesting Officer    Acting Commissioner of Patents and Trademarks